S. HAND.
DETACHABLE RUNNER.
APPLICATION FILED FEB. 15, 1909.

936,449.

Patented Oct. 12, 1909.

Witnesses.
W. F. Lakin.
Geo. B. Ward

Inventor.
Samuel Hand
per Ward & Joy
Attorney.

UNITED STATES PATENT OFFICE.

SAMUEL HAND, OF SOUTH MANCHESTER, CONNECTICUT.

DETACHABLE RUNNER.

936,449.

Specification of Letters Patent. Patented Oct. 12, 1909.

Application filed February 15, 1909. Serial No. 477,865.

*To all whom it may concern:*

Be it known that I, SAMUEL HAND, a citizen of the United States, residing at South Manchester, in the county of Hartford and State of Connecticut, have invented certain new and useful Improvements in Detachable Runners, of which the following is a specification.

The object of my invention is to provide a device of the class specified which has features of novelty and advantage.

Figure 1:
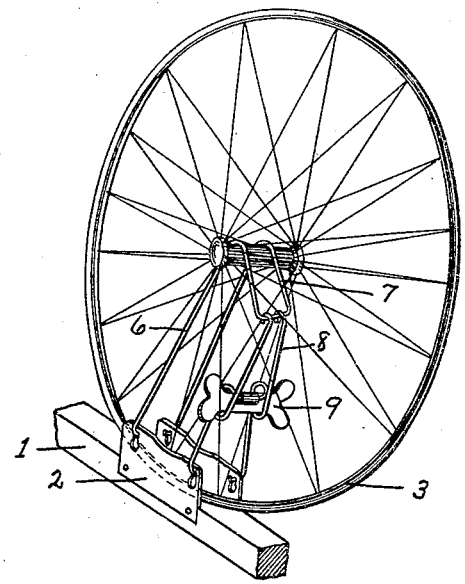
Figure 2:
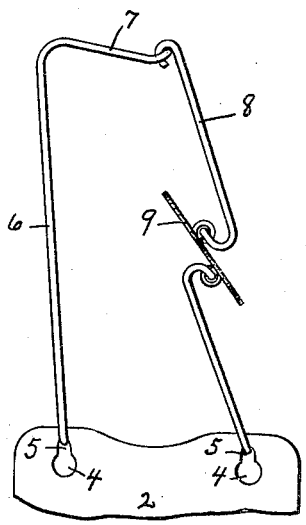
Figure 3:
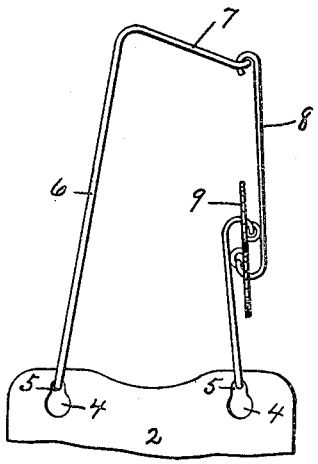

Figure 1 is a perspective view of the detachable runner in place on a wheel. Fig. 2 is a lateral view of the device with a clamping key in its open position. Fig. 3 is a lateral view of the device with a clamping key in its locked position.

On a runner —1— attached to the sides thereof, I provide two plates —2— between which the rim of a wheel —3— is adapted to be secured. At the top of each plate, both at the front end and at the rear end are arranged openings as at —4—4—. These openings are narrowed down to slots as at —5—5—. A single piece of heavy tempered wire —6— extends from the openings —4—4— to and over the hub of the wheel —3—. The ends of the wire are adapted to extend from the hub of the wheel through the spokes at its lower ends. The ends of the wire are crooked and have an enlarged tip by means of which the ends of the wire when engaging the slots are securely held in place. The wire is bent over the hub and extends rearwardly as at —7—. When this extension —7— is sprung down, the wheel —3— is securely held in place thereby. To spring this end —7— down, I provide the following means, which I prefer to use. A wire —8— engages the end of the extension —7—. The lower end of the wire —8— is secured to the top of a key —9—. At the lower end of said key —9— is secured a wire, two ends of which are adapted to extend through the spokes of the wheel and engage the slots at the rear ends of the plates —2—. When the wheel is in position, and the key —9— turned, the wire —8— is drawn down and snaps into its closed position. When the wire —8— is drawn down, the extension —7— clamps the hub of the wheel —3— and thereby the wheel and the runner are positively secured together. Whenever the runner comes in contact with any obstacle it is desirable to have sufficient spring action to release the shock caused thereby. This spring action is provided by the extension —7— which is adapted to spring just enough to relieve the shock.

My device is especially advantageous for light vehicles such as baby carriages as by merely turning the key —9— to its raised position the wires can readily be released and the runner thereby be detached.

I claim:—

1. In a detachable runner, plates secured to the sides thereof adapted to receive the rim of a wheel, a single strip of wire engaging the hub of said wheel and having a rearward spring extension, and means for clamping said extension securely to said hub.

2. In a detachable runner, plates secured to the sides thereof, adapted to receive the rim of the wheel, a single strip of wire engaging the hub of said wheel and having a rearward spring extension, said spring having two crooked ends engaging slots in said plates, and means for clamping said extension securely to said hub.

3. In a detachable runner, plates secured to the sides thereof, adapted to receive the rim of a wheel, a single strip of wire engaging the hub of said wheel and having a rearward spring extension, and means for clamping said extension securely to said hub, said means consisting of a key clamp engaging said extension and the rear end of said plates substantially as described.

In testimony whereof I affix my signature in presence of two witnesses.

SAMUEL HAND.

Witnesses:
EDWIN JOHNSON,
ANDERS E. JOHNSON.